(12) United States Patent  
Park et al.

(10) Patent No.: US 7,529,013 B2  
(45) Date of Patent: May 5, 2009

(54) OPTICAL MODULATOR MODULE PACKAGE

(75) Inventors: Heung-Woo Park, Suwon-si (KR); Chang-Su Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 62 days.

(21) Appl. No.: 11/503,507

(22) Filed: Aug. 11, 2006

(65) Prior Publication Data

US 2007/0047879 A1 Mar. 1, 2007

(30) Foreign Application Priority Data

Aug. 29, 2005 (KR) .............. 10-2005-0079568  
Aug. 7, 2006 (KR) .............. 10-2006-0074342

(51) Int. Cl.  
*G02F 1/00* (2006.01)  
*H01L 23/02* (2006.01)

(52) U.S. Cl. ............ 359/237; 359/298; 257/680

(58) Field of Classification Search ........... 359/237, 359/290–295, 298, 572; 257/680, 690, 692, 257/778, 687, 698, 724, 777, 414, 703, 704; 438/106, 108, 116, 121, 611, 618; 385/14–18, 385/92, 147; 345/108, 204; 313/17, 44, 313/422, 496; 348/203

See application file for complete search history.

(56) References Cited

U.S. PATENT DOCUMENTS

| | | | | | |
|---|---|---|---|---|---|
| 4,754,141 | A | * | 6/1988 | Mindock | 250/343 |
| 5,391,917 | A | * | 2/1995 | Gilmour et al. | 257/690 |
| 6,455,927 | B1 | * | 9/2002 | Glenn et al. | 257/686 |
| 6,483,030 | B1 | * | 11/2002 | Glenn et al. | 174/521 |
| 6,507,082 | B2 | * | 1/2003 | Thomas | 257/414 |
| 6,656,768 | B2 | * | 12/2003 | Thomas | 438/108 |
| 6,674,159 | B1 | | 1/2004 | Peterson | |
| 6,791,076 | B2 | * | 9/2004 | Webster | 250/239 |
| 7,453,130 | B2 | * | 11/2008 | Nakai | 257/432 |
| 2006/0222313 | A1 | * | 10/2006 | Hong | 385/147 |

* cited by examiner

*Primary Examiner*—Loha Ben  
(74) *Attorney, Agent, or Firm*—Christensen O'Connor Johnson Kindness PLLC

(57) ABSTRACT

An optical modulator module package includes a substrate having a through-hole through which light passes and having a circuit formed on at least one of its inner and outer surfaces; a transparent lid held in the through-hole for transmitting incident light inputted to an optical modulator element and diffracted light emitted from the optical modulator element; and a metal connection part attached to a surface of the substrate for mounting the optical modulator element and driver integrated circuits. With an optical modulator module package according to embodiments of the present disclosure, the size of the module package may be minimized, as a transparent lid installed with a displacement from the optical modulator element is embedded within the substrate.

16 Claims, 7 Drawing Sheets

Prior Art (a)

Prior Art

OPTICAL MODULATOR MODULE PACKAGE

CROSS-REFERENCE TO RELATED APPLICATIONS

This application claims the benefit of Korean Patent Application No. 2005-0079568 filed with the Korean Intellectual Property Office on Aug. 29, 2005, and of Korean Patent Application No. 2006-0074342 filed on Aug. 7, 2006, the disclosures of which are incorporated herein by reference in their entirety.

BACKGROUND

1. Technical Field

The present invention relates to an optical modulator, and in particular, to an optical modulator module package.

2. Description of the Related Art

An optical modulator is a circuit or device which loads signals on a beam of light (optical modulation) when the transmission medium is optical fiber or free space in the optical frequency range. The optical modulator is used in such fields as optical memory, optical display, printers, optical interconnection, and holograms, etc., and a great deal of development research is currently under way on display devices using the optical modulator.

The optical modulator may involve MEMS (Micro Electro Mechanical System) technology, in which three-dimensional structures are formed on silicon substrates using semiconductor manufacturing technology. There are a variety of applications in which MEMS is used, examples of which include various sensors for vehicles, inkjet printer heads, HDD magnetic heads, and portable telecommunication devices, in which the trend is towards smaller devices capable of more functionalities.

The MEMS element has a movable part spaced from the substrate to perform mechanical movement. MEMS can also be called a micro electromechanical system or element, and one of its applications is in the field of optical science. Using micromachining technology, optical components smaller than 1 mm may be fabricated, by which micro optical systems may be implemented. Specially fabricated semiconductor lasers may be attached to supports prefabricated by micromachining technology, so that micro Fresnel lenses, beam splitters, and 45° reflective mirrors may be fabricated and assembled by micromachining technology. Existing optical systems are composed using assembly tools to place mirrors and lenses, etc., on large, heavy optical benches. The size of the lasers is also large. To obtain performance in optical systems thus composed, significant effort is required in several stages of careful adjustment to calibrate the light axes, reflective angles, and reflective surfaces, etc.

Micro optical systems are currently selected and applied in telecommunication devices and information display and recording devices, due to such advantages as quick response time, low level of loss, and convenience in layering and digitalizing. For example, micro optical components such as micro mirrors, micro lenses, and optical fiber supports may be applied to data storage recording devices, large image display devices, optical communication elements, and adaptive optics.

For these functions, micro mirrors are applied in various ways according to the direction, such as the vertical, rotational, and sliding directions, and to the static and dynamic movement. Movement in the vertical direction is used in such applications as phase compensators and diffractometers, with movement in the direction of inclination used in applications such as scanners or switches, optical splitters, optical attenuators, and movement in the sliding direction used in optical shields or switches, and optical splitters.

The size of a micro mirror is 10 to 1000 μm, and the number of mirrors fabricated for an application is about 1 to 106. While the size of a micro mirror in a large screen display device is small, being about 10 to 50 μm, a number of mirrors corresponding to the number of pixels are required, so that about one million mirrors are needed. In the case of adaptive optics or in optical splitters, the size of a mirror is somewhat larger, being 10 to 50 μm, but the required number is smaller, being about several hundred. In the case of scanners or optical pick-up devices, the mirrors are increased to about several mm, where just one mirror may be sufficient for application. Thus, the size and number of micro mirrors vary considerably according to the application, and the application varies according to the direction of movement and to whether the movement is static or dynamic. Of course, the method of fabricating the micro mirrors also varies accordingly. While the mirrors in a large screen display device have sizes of several tens of μm, their response times are quite speedy, being about several tens of μs, whereas the mirrors in an optical splitter have sizes of several hundred μm and response times of several hundred μs. Mirrors having sizes of several mm are used in scanners, etc., and have response times of several μs.

FIG. 1 is an exploded perspective view of a conventional optical modulator module package. As seen in FIG. 1, the optical modulator module package 100 includes a substrate 110, a transparent substrate 120, an optical modulator element 130, driver integrated circuits 140a to 140d, a heat dissipation plate 150, and a connector 160. Here, the transparent substrate 120 is such that allows the formation of fine-pitch wiring and bump arrays, so that not only a printed circuit board, but also a glass substrate, silicone substrate, LTCC substrate, or multi-layer PCB may be used.

The substrate 110 is a typical semiconductor substrate, and the lower surface of the transparent substrate 120 is attached onto the substrate 110. Also, the optical modulator element 130 is attached to the upper surface of the transparent substrate 120 in correspondence to the hole formed on the substrate 110.

The optical modulator element 130 modulates the incident light inputted through the hole of the substrate 110 and emits diffracted light. The optical modulator element 130 is flip chip connected to the transparent substrate 120. Adhesive is placed around the optical modulator element 130 to form a seal from the outside environment, while electrical connection is maintained by the electrical wiring formed along the surface of the transparent substrate 120.

The driver integrated circuits 140a to 140d are flip chip connected around the optical modulator element 130 onto which the transparent substrate 120 is attached and supply driving power to the optical modulator element 130 according to control signals inputted from the outside.

The heat dissipation plate 150 removes heat generated from the optical modulator element 130 and the driver integrated circuits 140a to 140d, and thus a metallic material is used which readily dissipates heat.

A method of manufacturing the optical modulator module package 100 illustrated in FIG. 1 includes: attaching the connector 160 to the substrate 110, attaching the optical modulator element 130 and driver integrated circuits 140a to 140d to the transparent substrate 120; providing the heat dissipation plate 150, stacking the transparent substrate 120 on the substrate 110 and performing wire bonding, attaching the heat dissipation plate 150 to the optical modulator element 130 and the driver integrated circuits 140a to 140d, and mounting the optical modulator element 130 and the driver integrated circuits 140a to 140d to form an optical modulator module package 100.

It is to be noted that the optical modulator module package 100 illustrated in FIG. 1 has a relatively large number of components, and since each of the numerous components require a suitable amount of space for mounting, there is a limit to how much the size of the module package can be minimized. Also, in mounting the optical modulator element 130 directly on the transparent substrate 120, the electrical/optical functions are concentrated on the transparent substrate 120, whereby the costs for fabricating the necessary transparent substrate 120 is increased. Further, as the optical modulator element 130 is mounted directly on the transparent substrate 120, the narrow gap between the optical modulator element 130 and the transparent substrate 120 increases the influence of foreign substances. Other problems may also occur during the process of mounting the optical modulator element 130 directly on the transparent substrate 120, such as contamination and scratching due to foreign substances.

SUMMARY

An optical modulator module package is provided in which a transparent lid, installed with a displacement from the optical modulator element, is embedded within the substrate, so that the size of the module package is minimized.

Also, an optical modulator module package is provided, in which the electrical/optical functions are not concentrated on the transparent lid, as the optical modulator element is not mounted directly on the transparent lid.

An optical modulator module package is provided with which the fabrication of the transparent substrate is made inexpensively, as the electrical/optical functions are not concentrated on the transparent lid, and as standard semiconductor processes are utilized.

Also, an optical modulator module package is provided with which the affect of foreign substances between the optical modulator element and the transparent lid is decreased, as the optical modulator element is not mounted directly on the transparent lid.

Further, an optical modulator module package is provided with which the problem of contamination due to foreign substances occurring during the direct mounting of the optical modulator element on the transparent substrate is decreased, as the optical modulator element is not mounted directly on the transparent lid.

In addition, an optical modulator module package is provided which allows easier use in fine-pitch wiring applications, as the optical modulator is mounted on a silicon substrate manufactured by standard semiconductor processes.

Moreover, an optical modulator module package is provided with which optical noise is reduced, as the transparent substrate is tilted with respect to the optical modulator element.

An optical modulator module package includes: a substrate having a through-hole through which light passes and having a circuit formed on at least one of its inner and outer surfaces; a transparent lid held in the through-hole for transmitting incident light inputted to an optical modulator element and diffracted light emitted from the optical modulator element; and a metal connection part attached to a surface of the substrate for mounting the optical modulator element and driver integrated circuits.

Here, a cross section of the through-hole may be '□' (rectilinear, whether square, rectangular, or otherwise) or '⊥' (tee) shaped, or round, and the transparent lid may be held in the through-hole facing the optical modulator element.

Also, the optical modulator module package based on the present disclosure may further include an optical modulator element, mounted on the substrate in correspondence with the through-hole of the substrate, for modulating incident light inputted through the through-hole of the substrate to emit diffracted light; and at least one driver integrated circuit, mounted on the substrate adjacent the optical modulator element, for providing driving power to the optical modulator element according to control signals inputted from the outside.

Here, the transparent lid may be held in the through-hole with an inclination of a pre-configured angle.

The slope of the transparent lid may be about 4 degrees with respect to a horizontal line.

An optical modulator module package includes: a substrate having a first through-hole through which light passes and having a circuit formed on at least one of its inner and outer surfaces; a housing positioned on the substrate and having a second through-hole that includes the open surface of the first through-hole; a transparent lid held in the second through-hole for transmitting incident light inputted to an optical modulator element and diffracted light emitted from the optical modulator element; and a metal connection part attached to a surface of the substrate for mounting the optical modulator element and driver integrated circuits.

Here, a cross section of the second through-hole may be '□' (rectilinear) or '⊥' (tee) shape, and the transparent lid may be held in the second through-hole facing the optical modulator element.

Also, the optical modulator module package may further include an optical modulator element, mounted on the substrate in correspondence with the first through-hole of the substrate, for modulating incident light inputted through the first through-hole of the substrate to emit diffracted light; and at least one driver integrated circuit, mounted on the substrate adjacent the optical modulator element, for providing driving power to the optical modulator element according to control signals inputted from the outside.

Here, the optical modulator element and the driver integrated circuits may be flip chip connected to the substrate.

Also, the optical modulator element may be side sealed with epoxy resin.

Here, the metal connection part may be a metal bump or a metal pad.

Additional aspects and advantages of the present general inventive concept will be set forth in part in the description which follows, and in part will be obvious from the description, or may be learned by practice of the general inventive concept.

DETAILED DESCRIPTION

Hereinafter, embodiments of the disclosure will be described in more detail with reference to the accompanying drawings. In the description with reference to the accompanying drawings, those components are rendered the same reference number that are the same or are in correspondence regardless of the figure number, and redundant explanations are omitted. Embodiments of the disclosure may generally be applied to an MEMS package for transmitting or receiving signals to or from the outside. Also, an optical modulator in an MEMS package will first be described before discussing the disclosed embodiments.

Optical modulators can be divided mainly into a direct type, which directly controls the on/off state of light, and an indirect type, which uses reflection and diffraction. The indirect type may be further divided into an electrostatic type and a piezoelectric type. Optical modulators are applicable to the embodiments of the disclosure regardless of the operation type.

An electrostatic type grating optical modulator as disclosed in U.S. Pat. No. 5,311,360 includes a plurality of equally spaced-apart deformable reflective ribbons having reflective surfaces and suspended above the upper part of the substrate.

First, an insulation layer is deposited onto a silicon substrate, followed by the deposition of a sacrificial silicon dioxide film and a silicon nitride film. The silicon nitride film is patterned from the ribbons, and portions of the silicon dioxide film are etched so that the ribbons are maintained by the nitride frame on the oxide spacer layer. To modulate light having a single wavelength $\lambda 0$, the modulator designs the thicknesses of the ribbons and the oxide spacer to be $\lambda 0/4$.

The grating amplitude, of such a modulator limited to the vertical distance d between the reflective surfaces of the ribbons and the reflective surface of the substrate, is controlled by supplying voltage between the ribbons (the reflective surface of the ribbon, which acts as the first electrode) and the substrate (the conductive film at the bottom portion of the substrate, which acts as the second electrode).

Figure 1:
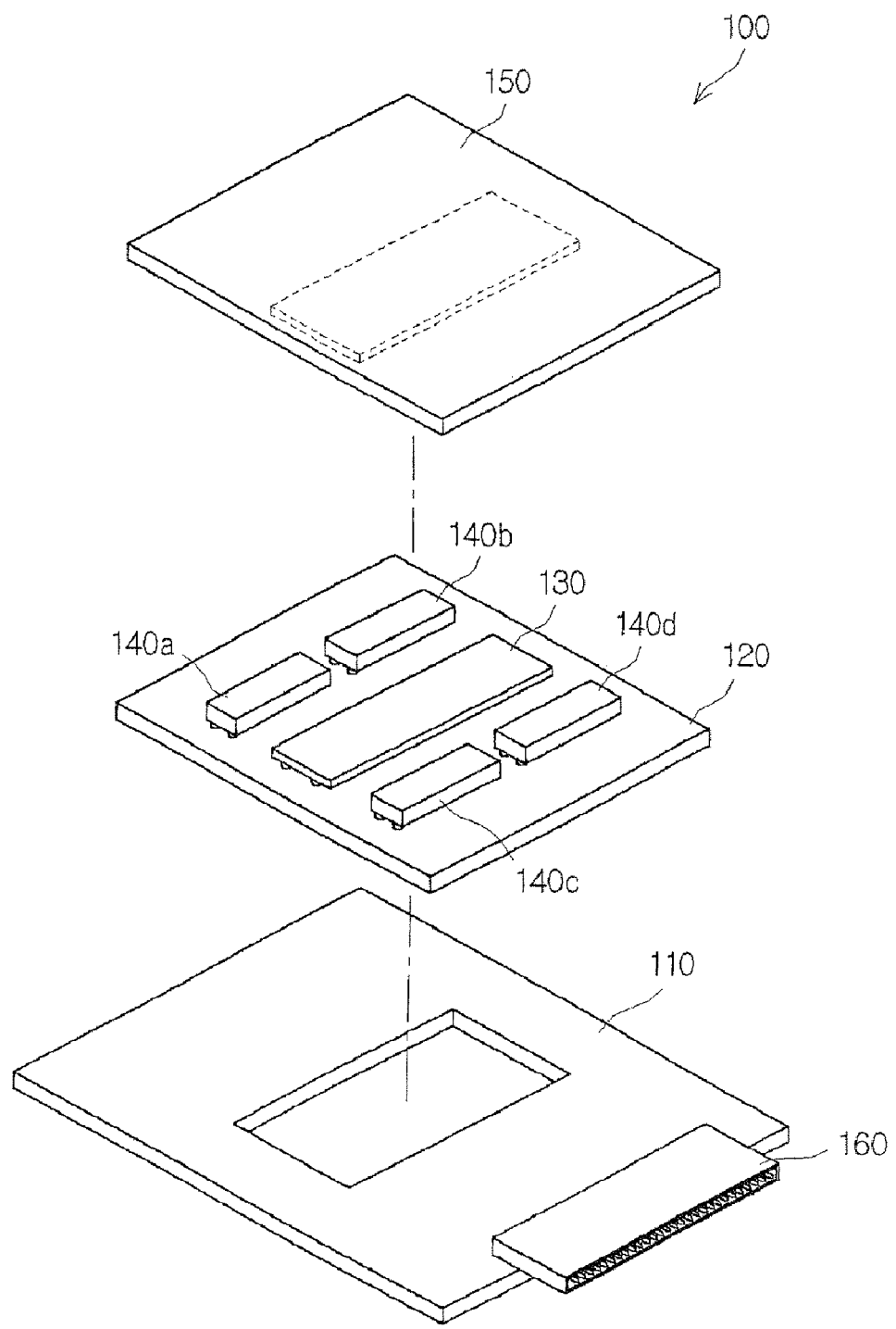
FIG. 1 is an exploded perspective view of a conventional optical modulator module package.
Figure 2A:
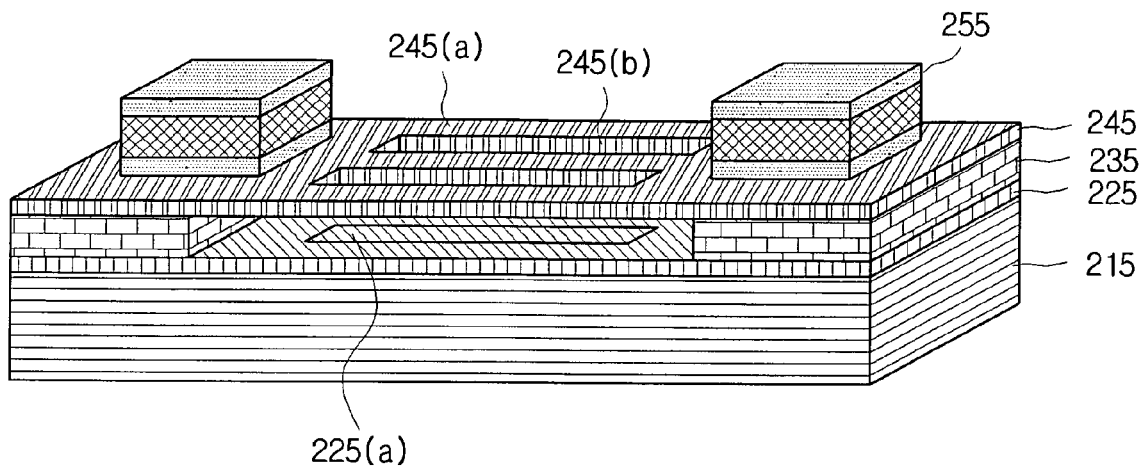
FIG. 2A is a perspective view of a diffraction type optical modulator module using piezoelectric elements, applicable to an embodiment of the disclosure.
Figure 2B:
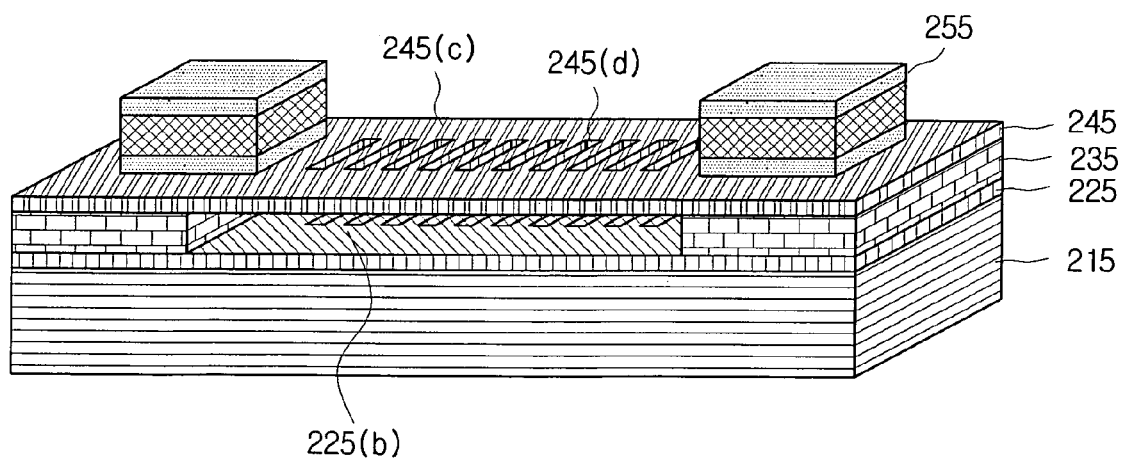
FIG. 2B is a perspective view of another diffraction type optical modulator module using piezoelectric elements, applicable to an embodiment of the disclosure.

FIG. 2A is a perspective view of a diffraction type optical modulator module using piezoelectric elements, applicable to an embodiment of the disclosure, and FIG. 2B is a perspective view of another diffraction type optical modulator module using piezoelectric elements, applicable to an embodiment of the disclosure. In FIGS. 2A and 2B are illustrated optical modulators, each including a substrate 215, an insulation layer 225, a sacrificial layer 235, a ribbon structure 245, and piezoelectric elements 255.

The substrate 215 is a commonly used semiconductor substrate, and the insulation layer 225 is deposited as an etch stop layer. The insulation layer 225 is formed from a material with a high selectivity to the etchant (the etchant is an etchant gas or an etchant solution) that etches the material used as the sacrificial layer. Here, reflective layers 225(a), 225(b) may be formed on the insulation layer 225 to reflect incident beams of light.

The sacrificial layer 235 supports the ribbon structure 245 such that the ribbon structure is displaced by a particular gap from the insulation layer 225, and forms a space in the center.

The ribbon structure 245 creates diffraction and interference in the incident light to provide optical modulation of signals as described above. The form of the ribbon structure 245 may be composed of a plurality of ribbon shapes according to the electrostatic type, and may comprise a plurality of open holes in the center portion of the ribbons according to the piezoelectric type. The piezoelectric elements 255 control the ribbon structure 245 to move vertically, according to the degree of up/down or left/right contraction and expansion generated by the difference in voltage between the upper and lower electrodes. Here, the reflective layers 225(a), 225(b) are formed in correspondence with the holes 245(b), 245(d) formed in the ribbon structure 245.

For example, in the case where the wavelength of a beam of light is $\lambda$, when there is no power supplied or when there is a predetermined amount of power supplied, the gap between an upper reflective layer 245(a), 245(c) formed on the ribbon structure and the insulation layer 225, on which is formed a lower reflective layer 225(a), 225(b), is equal to $n\lambda/2$ (wherein n is a natural number). Therefore, in the case of a 0-order diffracted (reflected) beam of light, the overall path length difference between the light reflected by the upper reflective layer 245(a), 245(c) formed on the ribbon structure and the light reflected by the insulation layer 225 is equal to $n\lambda$, so that constructive interference occurs and the diffracted light is rendered its maximum luminosity. In the case of +1 or −1 order diffracted light, however, the luminosity of the light is at its minimum value.

Also, when an appropriate amount of power is supplied to the piezoelectric elements 255, other than the supplied power mentioned above, the gap between the upper reflective layer 245(a), 245(c) formed on the ribbon structure and the insulation layer 225, on which is formed the lower reflective layer 225(a), 225(b), becomes $(2n+1)\lambda/4$ (wherein n is a natural number). Therefore, in the case of a 0-order diffracted (reflected) beam of light, the overall path length difference between the light reflected by the upper reflective layer 245(a), 245(c) formed on the ribbon structure and the light reflected by the insulation layer 225 is equal to $(2n+1)\lambda/2$, so that destructive interference occurs, and the diffracted light is rendered its minimum luminosity. In the case of +1 or −1 order diffracted light, however, the luminosity of the light is at its maximum value due to constructive interference. As a result of such interference, the optical modulator can load signals on the beams of light by controlling the quantity of the reflected or diffracted light.

While the foregoing describes the cases in which the gap between the ribbon structure 245 and the insulation layer 225, on which is formed the lower reflective layer 225(a), 225(b), is $n\lambda/2$ or $(2n+1)\lambda/4$, it is obvious that a variety of embodiments may be applied with regards the present invention which are operated with gaps that allow the control of the interference by diffraction and reflection.

The descriptions below will focus on the type of optical modulator illustrated in FIG. 2A described above.

Figure 2C:
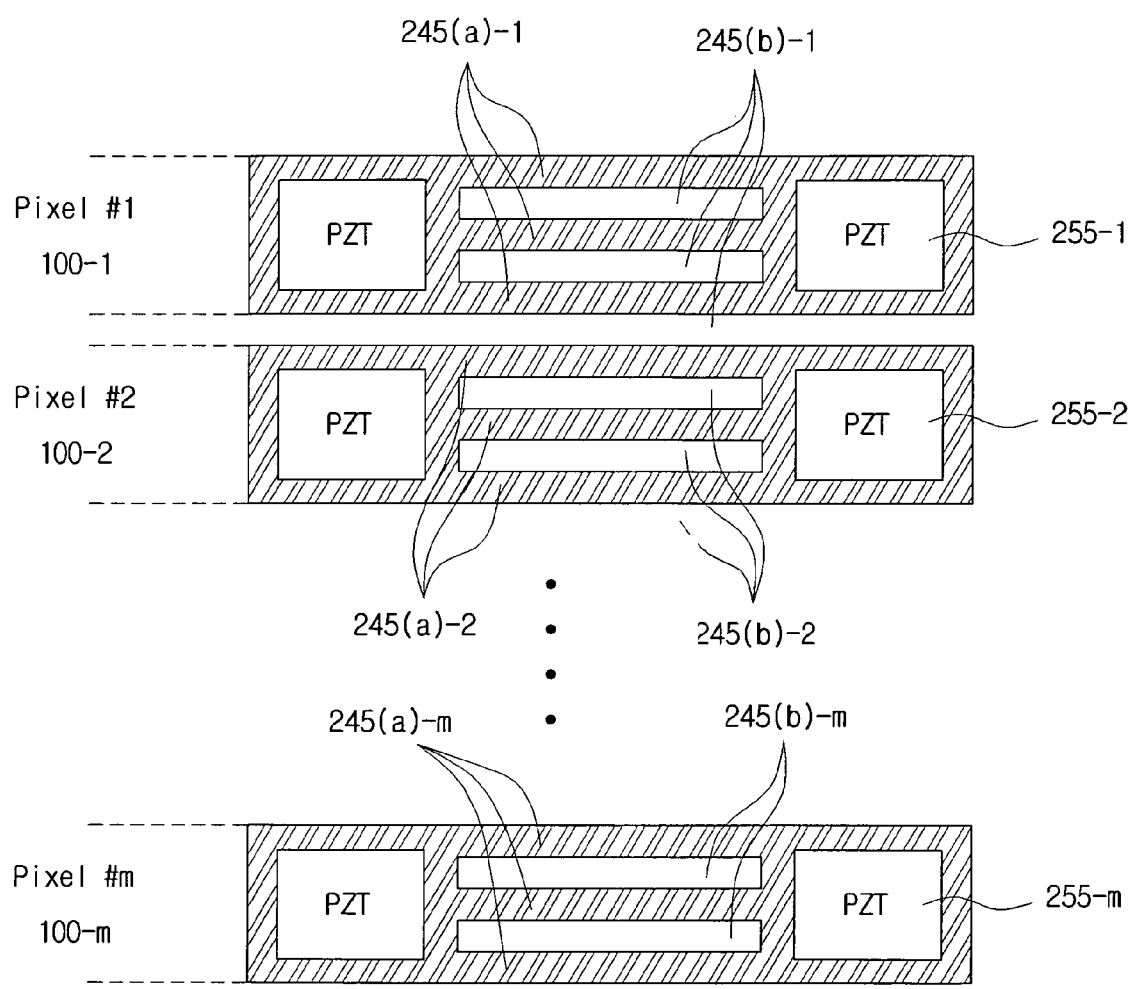
FIG. 2C is a plan view of a diffraction type optical modulator array applicable to an embodiment of the disclosure.

Referring to FIG. 2C, the optical modulator is composed of an m number of micromirrors 100-1, 100-2, . . . , 100-m, each responsible for pixel #1, pixel #2, . . . , pixel #m. The optical modulator deals with image information with respect to 1-dimensional images of vertical or horizontal scanning lines (Here, it is assumed that a vertical or horizontal scanning line consists of an m number of pixels.), while each micromirror 100-1, 100-2, . . . , 100-m deals with one pixel among the m pixels constituting the vertical or horizontal scanning line. Thus, the light reflected and diffracted by each micromirror is later projected by an optical scanning device as a 2-dimensional image on a screen. For example, in the case of VGA 640*480 resolution, modulation is performed 640 times on one surface of an optical scanning device (not shown) for 480 vertical pixels, to generate 1 frame of display per surface of the optical scanning device. Here, the optical scanning device may be a polygon mirror, a rotating bar, or a galvano mirror, etc.

While the description below of the principle of optical modulation concentrates on pixel #1, the same may obviously apply to other pixels.

In the present embodiment, it is assumed that the number of holes 245(b)-1 formed in the ribbon structure 245 is two. Because of the two holes 245(b)-1, there are three upper reflective layers 245(a)-1 formed on the upper portion of the ribbon structure 245. On the insulation layer 225, two lower reflective layers are formed in correspondence with the two holes 245(b)-1. Also, there is another lower reflective layer formed on the insulation layer 225 in correspondence with the gap between pixel #1 and pixel #2. Thus, there are an equal number of upper reflective layers 245(a)-1 and lower reflective layers per pixel, and as discussed with reference to FIG. 2A, it is possible to control the luminosity of the modulated light using 0-order diffracted light or ±1-order diffracted light.

Figure 2D:
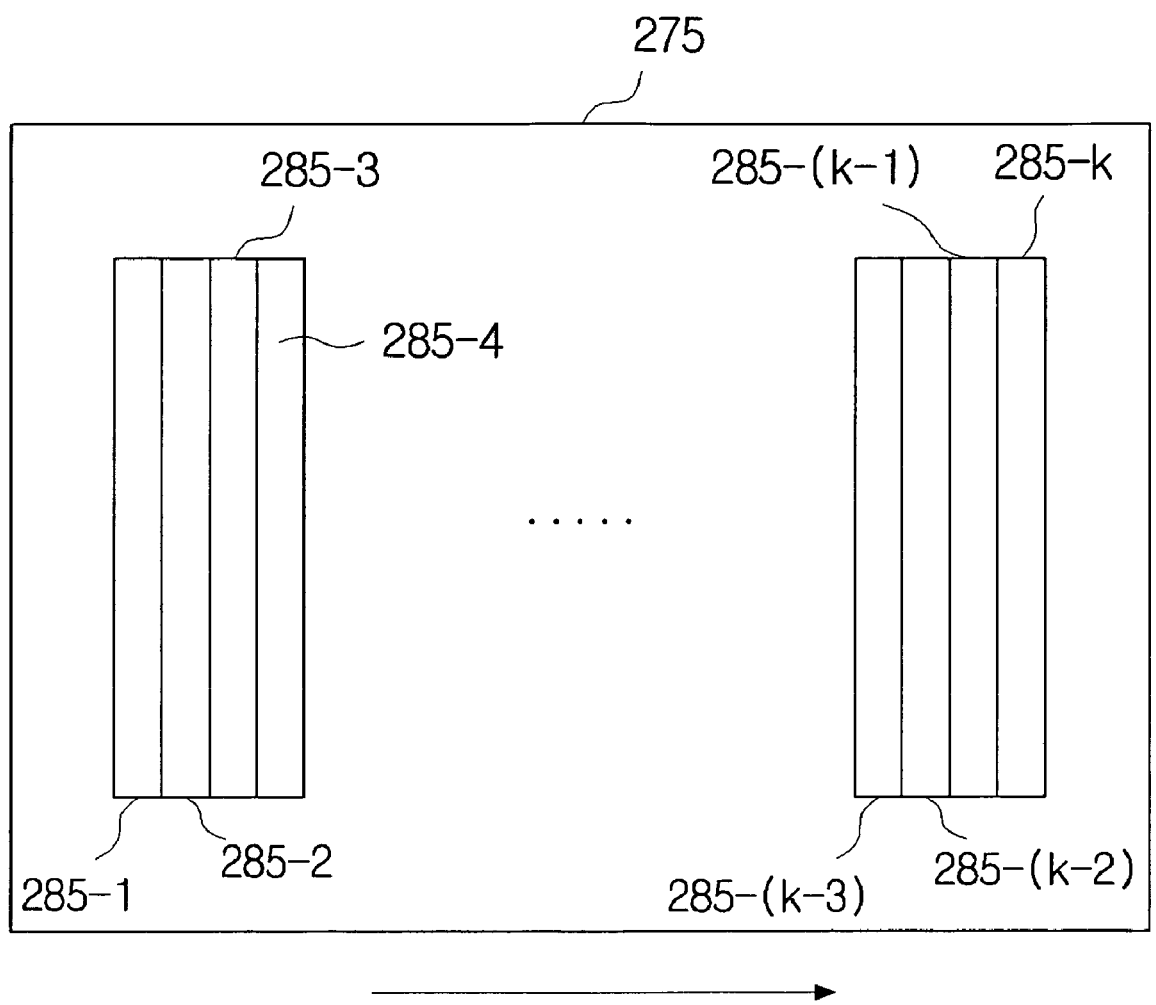
FIG. 2D is a schematic diagram illustrating an image generated on a screen by means of a diffraction type optical modulator array applicable to an embodiment of the disclosure.

FIG. 2D is a schematic diagram illustrating an image generated on a screen by means of a diffraction type optical modulator array applicable to an embodiment of the invention.

Illustrated is a display 285-1, 285-2, 285-3, 285-4, . . . , 285-(k-3), 285-(k-2), 285-(k-1), 285-k generated when beams of light reflected and diffracted by an m number of vertically arranged micromirrors 100-1, 100-2, . . . , 100-m are reflected by the optical scanning device and scanned horizontally onto a screen 275. One image frame may be projected with one revolution of the optical scanning device. Here, although the scanning direction is illustrated as being from left to right (the direction of the arrow), it is apparent that images may be scanned in other directions (e.g. in the opposite direction).

In an embodiment of the disclosure, an optical modulator element and driver integrated circuits for its operation are mounted on the substrate, while a transparent lid, through which incident light and diffracted light inputted to or emitted from the optical modulator element are transmitted, is provided with a particular amount of displacement from the optical modulator element.

The foregoing explanation described the cross-sectional figures generally illustrating the optical modulator element, and hereinafter the optical modulator module package according to the present disclosure will be described based on specific embodiments with reference to the accompanying figures.

Figure 2E:
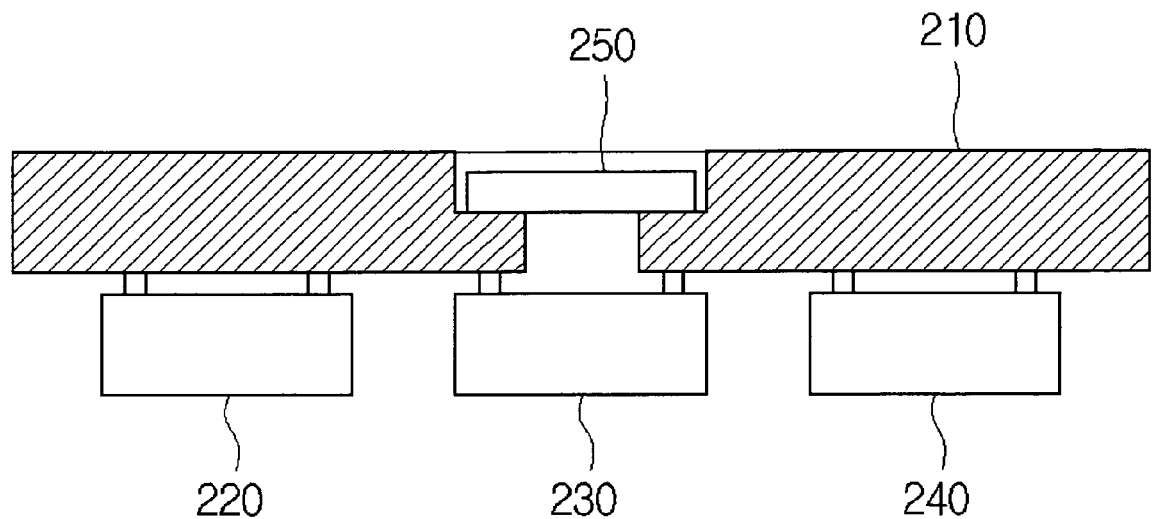
FIG. 2E is a cross-sectional view of an optical modulator module package according to a first embodiment of the disclosure.

FIG. 2E is a cross-sectional view of an optical modulator module package according to a first embodiment of the disclosure. Referring to FIG. 2E, an optical modulator module package includes a substrate 210, driver integrated circuits 220, 240, an optical modulator element 230, and a transparent lid 250.

The substrate 210 is formed with a hole through which incident light may be inputted to or diffracted light may be emitted from the optical modulator element 230, and a circuit is formed on at least one of the inner and outer surfaces of the substrate 210. Thus, the substrate 210 transfers control signals inputted from an outside control circuit to the driver integrated circuits 220, 240. Here, the electrical connection with the driver integrated circuits 220, 240 may be achieved through flip chip bonding. The substrate 210 may further comprise a metal bump or pad (the metal bump and metal pad may be referred to commonly as a metal connection part) attached onto a surface thereof for mounting the optical modulator element and driver integrated circuits on the substrate. Here, the metal bump and metal pad may have a size difference within a range typically used. Thus, the metal bump formed on the substrate 210 may flip chip connect to a metal pad formed on the optical modulator element or on the driver integrated circuits. Alternately, a metal pad formed on the substrate 210 may flip chip connect to a metal bump formed on the optical modulator element or on the driver integrated circuits. Here, the substrate 210 may be formed from a semiconductor silicon substrate, LTCC (low temperature cofired ceramic), or HTCC (high temperature cofired ceramic), on which fine-pitch processes may be performed.

The optical modulator element 230 is formed on the upper surface of the transparent lid 250, which is in correspondence with the hole of the substrate 210, and modulates the incident light inputted via the through-hole of the substrate 210 to emit diffracted light. Here, the optical modulator element 230 may be flip chip connected to the substrate 210.

The optical modulator element 230 is flip chip connected to the substrate 210 in correspondence with the transparent lid 250, and has a rectangular cross section, being relatively longer in one direction. Also, there is adhesive, etc., placed around the optical modulator element 230 to form a seal from the outside environment. With regards forming a seal, a dam may also be formed around the optical modulator element 230 to form a seal using a pre-configured dispensing liquid.

Further, the optical modulator element 230 may be side sealed with epoxy resin. In other words, the optical modulator element 230 may be protected by coating epoxy resin around the optical modulator element 230. That is, since epoxy resin typically has the superior mechanical properties of thermosetting resin, has high dimensional stability, and has high mechanical workability, it may be used to protect the optical modulator element 230.

The driver integrated circuits 220, 240 are flip chip connected around and/or adjacent the optical modulator element 230, to which the transparent lid 250 is attached, and supply driving power to the optical modulator element 230 according to the control signals inputted from the outside. The driver integrated circuits 220, 240 have rectangular cross sections and are smaller than the optical modulator element 230, and the number of driver integrated circuits 220, 240 may be increased or decreased as necessary, depending on the size of the optical modulator element 230. Thus, although two driver integrated circuits 220, 240 are illustrated in FIG. 2E, the invention is not thus limited. Here, as the optical modulator element 230 and the driver integrated circuits 220, 240 are not mounted directly on the transparent lid 250, fine-pitch wiring is possible. That is, it is more advantageous to form micro circuit patterns when circuit patterns are formed on the substrate 210, which is generally like a silicon substrate, rather than on the transparent lid 250, which is generally like glass.

The transparent lid 250 has its lower surface held in the through-hole formed in the substrate 210, and is preferably formed from a light-transmissive material such that allows adequate transmission of the incident light and diffracted light. For example, the transparent lid 250 may be glass. Further, the transparent lid 250 may be manufactured such that certain areas, where the incident light and diffracted light are not to be transmitted, are laminated with an absorptive film or have a diffused reflection structure to efficiently absorb light and prevent diffused reflection on the upper surface where the incident light is to be absorbed, or may be laminated on one or both surfaces with anti-reflective coating to decrease or eliminate undesired radiation. Here, a black metal may be used for the absorptive film. The cross section of the through-hole formed in the substrate 210 is a '⊥' (tee) shape, and the transparent lid 250 may be positioned in the through-hole facing the optical modulator element 230, i.e. in the wider open portion of the cross section of the through-hole. Thus, the transparent lid 250 may be supported by the substrate 210 at the narrower open portion of the through-hole. Also, in another embodiment, the cross section of the through-hole of the substrate 210 may be a '☐' (rectilinear) shape, with the transparent lid 250 held in the through-hole facing the optical modulator element. Here, the transparent lid 250 may be held and secured in the through-hole using a predetermined amount of adhesive.

As the optical modulator element is not mounted directly on the transparent lid, fine-pitch wiring is made possible. While it is also possible to perform the process of forming fine-pitch wiring on a glass substrate, a dry etching process is required. However, a glass substrate is generally applied with anti-reflective coating (AR coating) to improve transmissivity, where there is a high possibility that the anti-reflective coating will be damaged by the dry etching process. Also, as the electrical/optical/mechanical functions are concentrated on the glass substrate, its fabrication becomes more difficult, and costs are increased. Thus, using a silicon substrate as in the present invention so that among the various functions of a transparent substrate, the electrical/mechanical functions are dealt with by the silicon substrate and only the optical functions are dealt with by the glass substrate, is advantageous in terms of both fabrication and cost. Since semiconductor processes may be used directly when using a silicon substrate, it is possible to form fine-pitch wiring, and the adhesion of the films may be improved.

Figure 3:
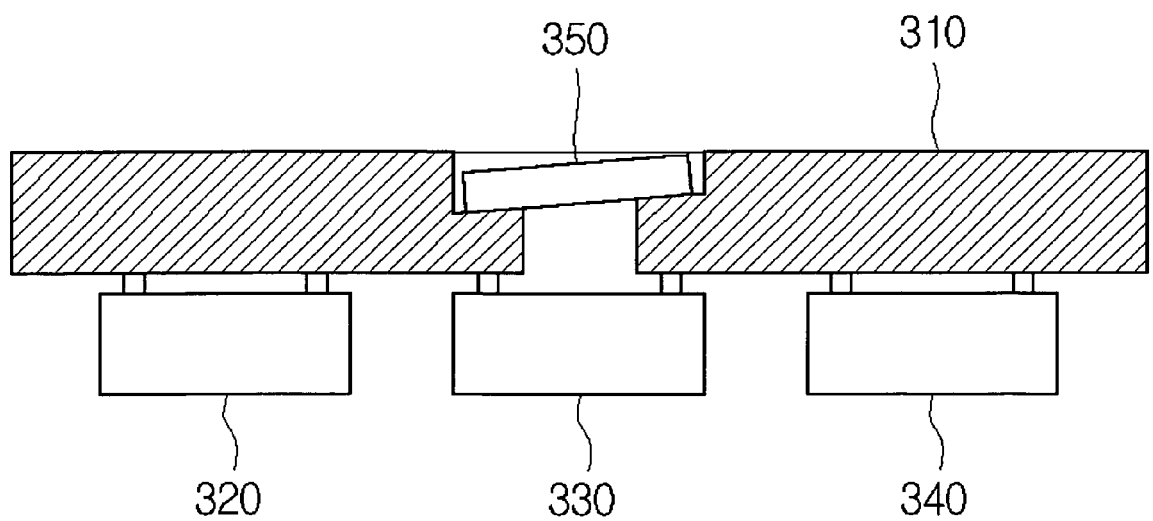
FIG. 3 is a cross-sectional view of an optical modulator module package according to a second embodiment of the disclosure.

FIG. 3 is a cross-sectional view of an optical modulator module package according to a second embodiment of the disclosure. Referring to FIG. 3, the optical modulator module package includes a substrate 310, driver integrated circuits 320, 340, an optical modulator element 330, and a transparent lid 350. The descriptions below will be focused on differences from the first embodiment.

The transparent lid 350 may be held within the substrate 310 at an inclination of a pre-configured angle. That is, the through-hole of the substrate 310 is manufactured such that its shape allows the transparent lid 350 to be installed at an inclination. Here, it is apparent that there is no limit to the pre-configured angle by which the transparent lid 350 is inclined, as long as it minimizes the amount of incident light and diffracted light reflected by the transparent lid 350. Therefore, this angle may be configured through experiments, but a slope of about 4 degrees with respect to a horizontal line may desirably reduce reflection loss. In the case of an optical communication element, an inclination of about 4 degrees is used so as to reduce the reflection loss of optical signals. That is, the amounts of incident light and diffracted light reflected by the transparent lid 350 may be reduced more when the transparent lid 350 is inclined with respect to the optical modulator element 330 than when the two are parallel. Utilizing this property, the transparent lid 350 is held in the substrate 310 with an inclination by a particular angle.

Here, the form in which the transparent lid 350 is held in the through-hole in the substrate 310 may be implemented in many variations. Referring to FIG. 3, the cross section of the through-hole formed in the substrate 310 has a '⊥' (tee) shape, where the transparent lid 350 may be positioned in the wider open portion of the through-hole. Here, the through-hole formed in the substrate 310 may be tilted to one side from the '⊥' (tee) shape, so that the transparent lid 350 forms a particular angle with the optical modulator element 330. In this case, the transparent lid 350 may be attached to the substrate 310 by means of adhesive.

In another embodiment, the cross section of the through-hole formed in the substrate 310 may be a '+' (cross) shape, with the transparent lid 350 held in the middle cavity. In this case, the process of positioning the transparent lid 350 may be added to the process of manufacturing the substrate 310. Since the transparent lid 350 is enclosed in the through-hole formed in the substrate 310, there is no additional adhesive necessary for attaching the transparent lid 350 to the substrate 310.

Figure 4:
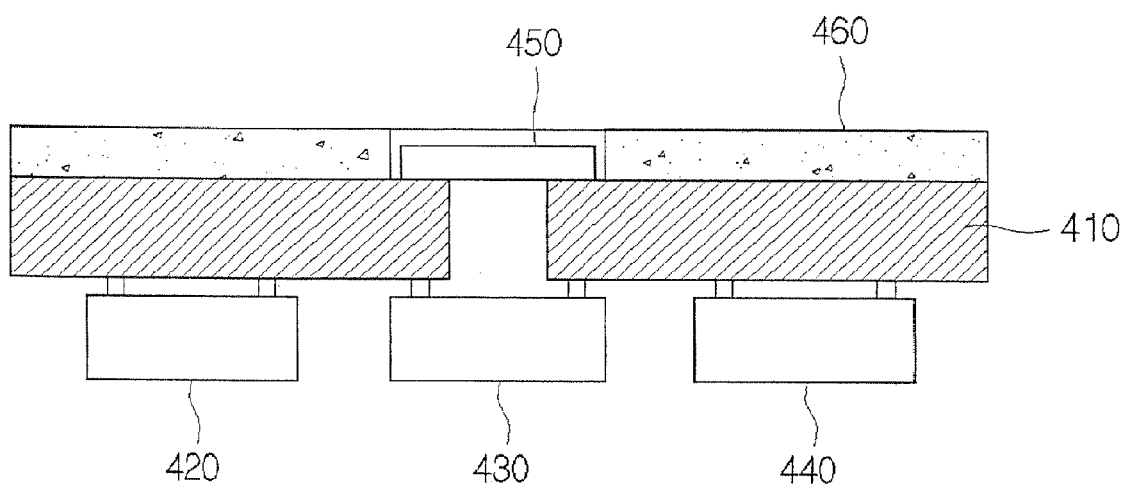
FIG. 4 is a cross-sectional view of an optical modulator module package according to a third embodiment of the disclosure.

FIG. 4 is a cross-sectional view of an optical modulator module package according to a third embodiment of the disclosure. Referring to FIG. 4, the optical modulator module package includes a substrate 410, driver integrated circuits 420, 440, an optical modulator element 430, a transparent lid 450, and a housing 460. The descriptions below will be focused on differences from the first embodiment.

The housing 460 is attached to a surface of the substrate 410, with a second through-hole formed in correspondence with a first through-hole formed on the substrate 410. Thus, the first through-hole is formed during the manufacture of the substrate 410, and the second through-hole, which has a larger open surface than does the first through-hole, is formed during the manufacture of the housing 460. Afterwards, the transparent lid 450, which has a width greater than that of the open surface of the first through-hole and smaller than that of the open surface of the second through-hole, is deposited onto the substrate 410. Thus, according to the third embodiment, the process of forming the first through-hole on the substrate 410 can be performed in a simplified manner.

Figure 5A:
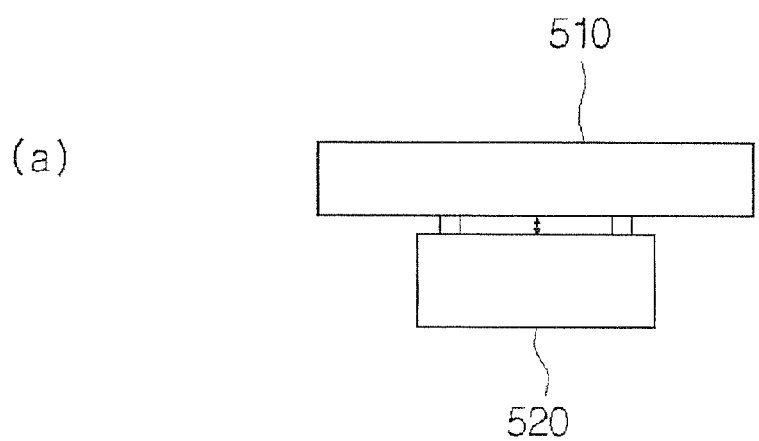
FIGS. 5A and 5B illustrate a comparison between an optical modulator module package according to an embodiment of the disclosure and a conventional optical modulator module package.
Figure 5B:
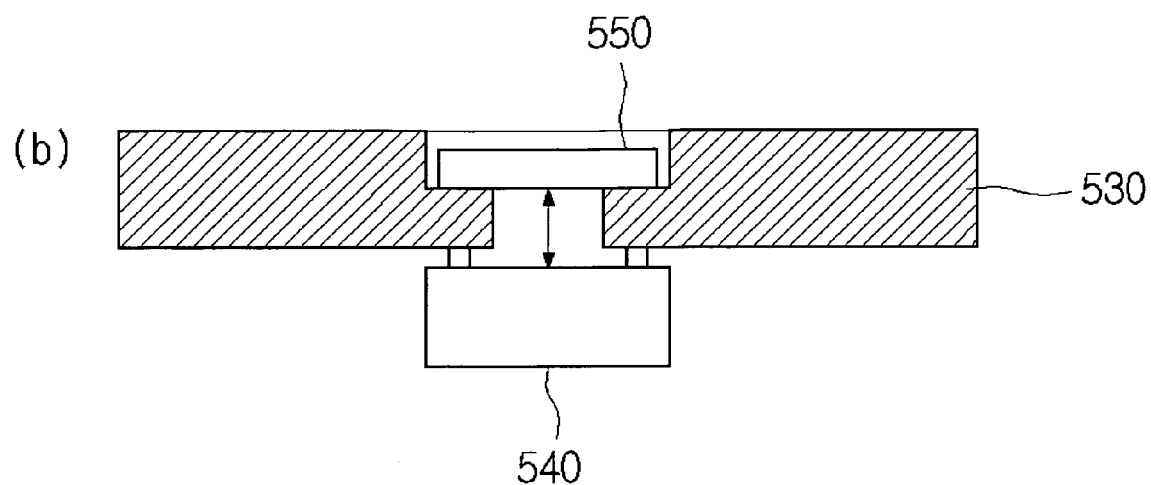

FIGS. 5A and 5B illustrate a comparison between an optical modulator module package according to an embodiment of the disclosure and a conventional optical modulator module package. In FIGS. 5A and 5B are illustrated a conventional optical modulator module package (a) and an optical modulator module package according to an embodiment of the disclosure (b). The conventional optical modulator module package (a) includes a transparent substrate 510 and an optical modulator element 520, while the optical modulator module package according to an embodiment of the disclosure (b) includes a substrate 530, a transparent lid 550, and an optical modulator element 540.

The distance between the transparent lid 550 and the optical modulator element 540 is greater than the distance between the transparent substrate 510 and the optical modulator element 520. Thus, according to embodiments of the invention, there is less influence of foreign substances that may be interposed between the transparent lid 550 and the optical modulator element 540. For example, when the inputted incident light or the outputted diffracted light is diffracted or dispersed due to foreign substances or scratches, etc., on the transparent lid 550, the greater the distance between the transparent lid 550 and the optical modulator element 540, the less the influence of such diffraction or dispersion. Thus, according to embodiments of the present invention, the influence is reduced of foreign substances that may be interposed between the transparent lid 550 and the optical modulator element 540.

The present invention is not limited to the foregoing embodiments, and it is to be appreciated that those skilled in the art can change or modify the embodiments without departing from the scope of the invention.

As set forth above, with the optical modulator module package disclosed, the size of the module package may be minimized, as a transparent lid installed with a displacement from the optical modulator element is embedded within the substrate.

Also, with the optical modulator module package disclosed, the electrical/optical functions do not have to be concentrated on the transparent lid, as the optical modulator element is not mounted directly on the transparent lid.

Also, with the optical modulator module package disclosed, the fabrication of the transparent substrate may be made inexpensively, as the electrical/optical functions are not concentrated on the transparent lid.

In addition, with the optical modulator module package disclosed, the influence of foreign substances between the optical modulator element and the transparent lid may be decreased, as the optical modulator element is not mounted directly on the transparent lid.

Further, with the optical modulator module package disclosed, the problem of contamination due to foreign substances occurring during the direct mounting of the optical modulator element on the transparent substrate may be decreased, as the optical modulator element is not mounted directly on the transparent lid.

Also, the optical modulator module package disclosed allows fine-pitch wiring, as the optical modulator is not mounted directly on the transparent lid.

Additionally, the through-holes in the substrate and/or the housing can be of other shapes, including, for instance, hexagonal, octagonal, round, oval, or elliptical.

While examples of the invention have been described with reference to the disclosed embodiments, it is to be appreciated that those skilled in the art can change or modify the embodiments without departing from the scope and spirit of the invention or its equivalents as stated below in the claims.

What is claimed:

1. An optical modulator module package, comprising:
    a silicon substrate having a through-hole formed therein through which incident light passes;
    a transparent lid held in the through-hole for transmitting the incident light inputted to an optical modulator element and diffracted light emitted from the optical modulator element; and
    a metal connection part attached to a surface of the silicon substrate for mounting the optical modulator element and driver integrated circuits on the silicon substrate.

2. The optical modulator module package of claim 1, wherein the metal connection part is a metal bump or a metal pad.

3. The optical modulator module package of claim 1, wherein:
    the through-hole is formed in a cross sectional shape selected from a rectilinear shape, a tee-shape, a hexagonal shape, an octagonal shape, a round shape, an oval shape, and an elliptical shape; and
    the transparent lid is held in the through-hole facing the optical modulator element.

4. The optical modulator module package of claim 1, wherein:
    the optical modulator element is mounted on the silicon substrate in correspondence with the through-hole of the silicon substrate, for modulating the incident light inputted through the through-hole of the silicon substrate to emit diffracted light; and
    at least one driver integrated circuit, mounted on the silicon substrate adjacent the optical modulator element, for providing driving power to the optical modulator element according to control signals inputted from the outside.

5. The optical modulator module package of claim 4, wherein the optical modulator element and the driver integrated circuits are flip chip connected to the silicon substrate.

6. The optical modulator module package of claim 4, wherein the optical modulator element is side sealed with epoxy resin.

7. The optical modulator module package of claim 1, wherein the transparent lid is held in the through-hole with an inclination of a pre-configured angle.

8. The optical modulator module package of claim 7, wherein the slope of the transparent lid is substantially 4 degrees with respect to a horizontal line.

9. An optical modulator module package, comprising:
    a substrate having a first through-hole formed therein through which incident light passes;
    a housing positioned on the substrate and having a second through-hole formed therein, wherein the second through-hole is in registry with the first through-hole;
    a transparent lid held in the second through-hole for transmitting the incident light inputted to an optical modulator element and diffracted light emitted from the optical modulator element; and
    a metal connection part attached to a surface of the substrate for mounting the optical modulator element and driver integrated circuits.

10. The optical modulator module package of claim 9, wherein the metal connection part is a metal bump or a metal pad.

11. The optical modulator module package of claim 10, wherein the transparent lid is disposed at an angle in the second through-hole relative to the interface between the substrate and the housing.

12. The optical modulator module package of claim 9, wherein:
    the first and second through-holes cooperatively form a cross sectional shape selected from the group consisting of a rectilinear shaped cross section, a tee shaped cross section, a hexagonal shaped cross section, an octagonal shaped cross section, a round cross section, an oval cross section, and an elliptical cross section; and
    the transparent lid is held in the second through-hole facing the optical modulator element.

13. The optical modulator module package of claim 9, wherein the cross sectional size of the second through-hole is larger than the cross sectional size of the first through-hole, and the transparent lid is disposed within the second through-hole and supported therein by the substrate.

14. The optical modulator module package of claim 9, wherein:

the optical modulator element is mounted on the substrate in correspondence with the first through-hole of the substrate, for modulating the incident light inputted through the first through-hole of the substrate to emit diffracted light; and at least one driver integrated circuit, mounted on the substrate adjacent the optical modulator element, for providing driving power to the optical modulator element according to control signals inputted from the outside.

15. The optical modulator module package of claim 14, wherein the optical modulator element and the driver integrated circuit are flip chip connected to the substrate.

16. The optical modulator module package of claim 14, wherein the optical modulator element is side sealed with epoxy resin.

* * * * *